Dec. 15, 1925.
T. SPOONER
1,565,519
APPARATUS FOR MAGNETIC SPRING TESTING
Filed April 21, 1921      2 Sheets-Sheet 1
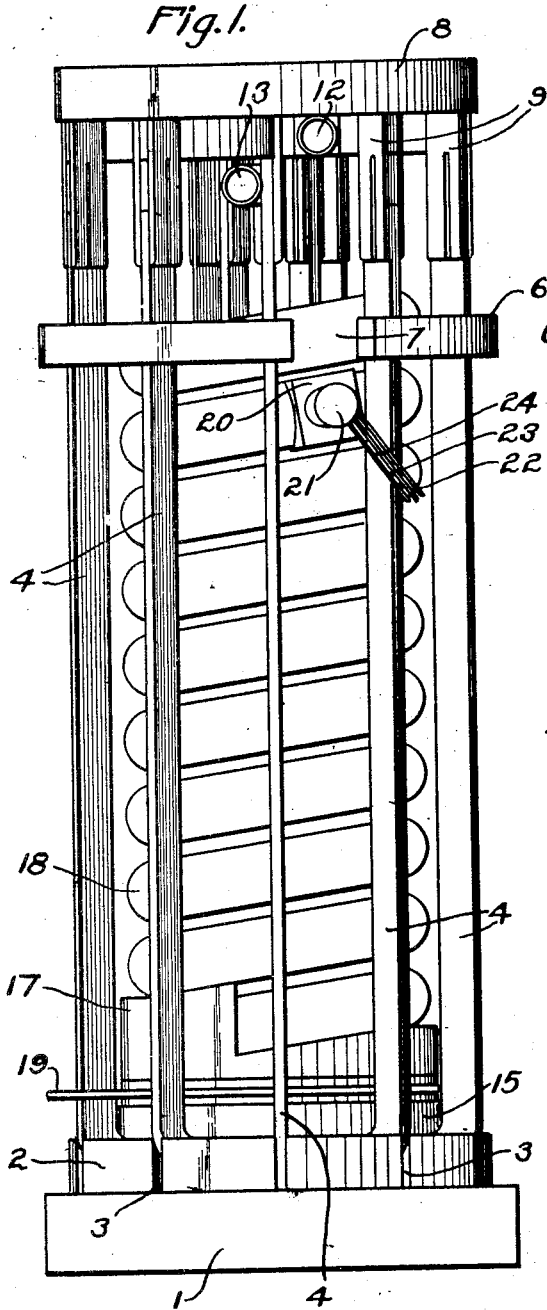
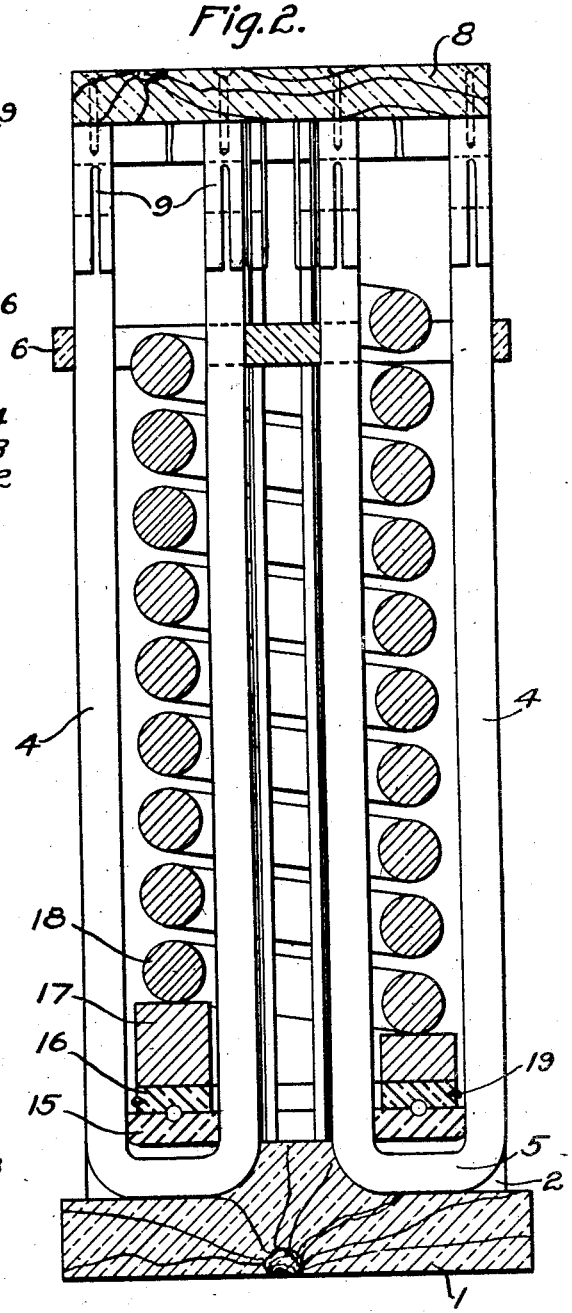
WITNESSES:
INVENTOR
Thomas Spooner.
BY
ATTORNEY Dec. 15, 1925.  
T. SPOONER  
1,565,519  
APPARATUS FOR MAGNETIC SPRING TESTING  
Filed April 21, 1921  2 Sheets-Sheet 2
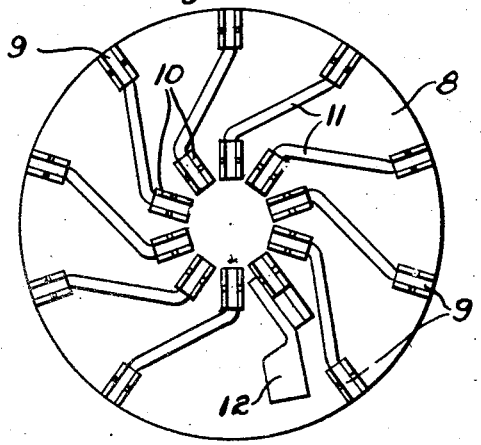
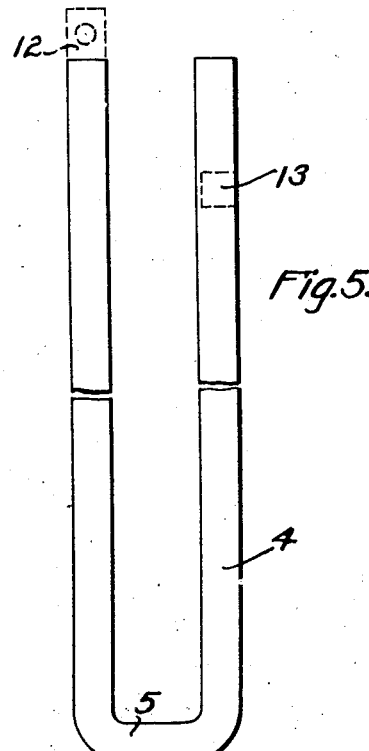
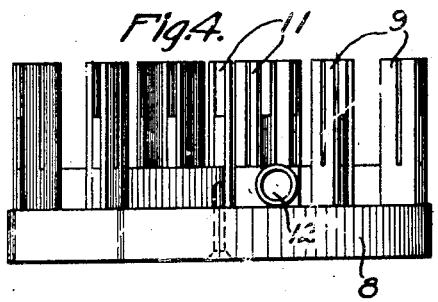
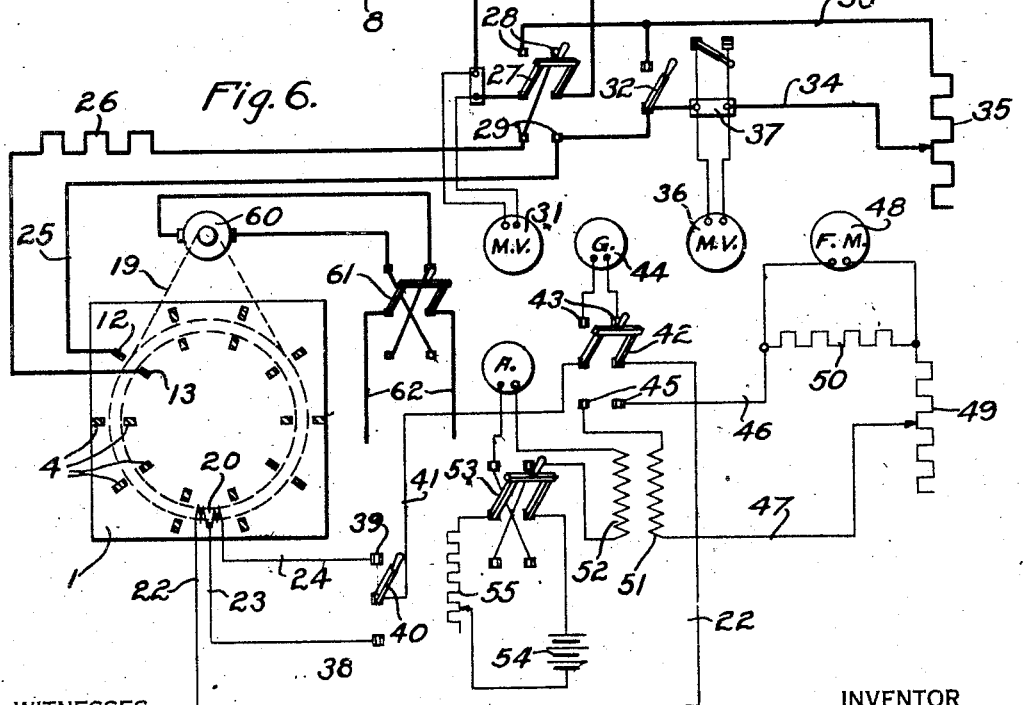
INVENTOR  
Thomas Spooner.  
BY  
ATTORNEY Patented Dec. 15, 1925.

1,565,519

UNITED STATES PATENT OFFICE.

THOMAS SPOONER, OF EDGEWOOD PARK, PENNSYLVANIA, ASSIGNOR TO WESTINGHOUSE ELECTRIC & MANUFACTURING COMPANY, A CORPORATION OF PENNSYLVANIA.

APPARATUS FOR MAGNETIC SPRING TESTING.

Application filed April 21, 1921. Serial No. 463,862.

*To all whom it may concern:*

Be it known that I, THOMAS SPOONER, a citizen of the United States, and a resident of Edgewood Park, in the county of Allegheny and State of Pennsylvania, have invented a new and useful Improvement in Apparatus for Magnetic Spring Testing, of which the following is a specification.

This invention relates to testing of various materials, more especially to magnetic testing of springs and similar objects.

The present invention is designed to provide an apparatus for testing which will enable the operator to determine the qualities of objects of iron or steel, such as hardened locomotive springs, quickly and accurately without resorting to destructive tests.

The present invention is based upon the fact that any flaws in iron and similar magnetic material placed in a magnetic field cause a distortion of the magnetic field, such distortion being measured by a suitable measuring instrument, such as a galvanometer. This invention also utilizes the hysteresis data for determining the composition of the material and heat treatment to which the material was subjected. For instance, the coercive force necessary to reduce the remanent magnetism to zero is a direct indication of the hardness of the material.

A method of determining flaws in magnetic material which has been proposed, consists in magnetizing the sample to be tested by suitable means and then passing an exploring coil connected to a galvanometer along the sample. Flaws or defects in the sample produce magnetic leakage which changes the flux threading through the exploring coil, causing a deflection in the galvanometer which is proportional to the amount of leakage at that point and is an accurate indication of the seriousness of the defect existing there.

My present invention utilizes the principle of the aforesaid method and combines with the same a method of and means for obtaining the various hysteresis data, such as maximum induction, remanence and coercive force.

In practicing my invention, I provide a source of magnetizing current and pass such current through a series of coils surrounding the spring or other object to be tested. An exploring coil consisting of two differentially wound coils adapted to be connected, either in series or separately, to suitable measuring instruments is so placed as to surround the spring. Suitable means are provided for rotating the spring within the magnetizing coils at a uniform rate, and the deflections of the measuring instruments, as the coil passes over various parts of the spring, are noted. From the data thus obtained, any flaws or defects in the material may readily be determined and the heat treatment of the material may be accurately gauged thereby.

In the accompanying drawings forming a part hereof and which illustrate one form of my invention, Fig. 1 is an elevational view of the magnetizing member with a spring to be tested in place;

Fig. 2 is a vertical sectional view of the apparatus shown in Fig. 1;

Fig. 3 is a bottom plan view of the cap or connector member of the apparatus;

Fig. 4 is an inverted elevational view of the same;

Fig. 5 is an elevational view of one of the U-shaped bars forming the magnetizing coil, and Fig. 6 is a diagrammatic view of the apparatus and its electrical connections.

The testing apparatus comprises a base 1 of insulating material having an extension 2 thereon, a plurality of radial slots 3 being formed in the extension 2. U-shaped bars 4 of conducting material, usually copper, are placed within slots 3 and extend upwardly, the lower ends or bases 5 thereof being securely fastened in said slots. A member 6 of insulating material placed near the upper ends of bars 4 serves to hold them in fixed position. An opening 7 is provided in member 6.

A cap or connector member 8, composed of insulating material, is provided with a series of depending spring contact members 9 disposed adjacent to its outer periphery and a similar series of spring contact members 10 disposed adjacent to its center, all of the contact members being so placed as to allow the upper ends of bars 4 to fit therein. Conductor members 11 are secured between pairs of contacts 9 and 10, as shown in Figs. 3 and 4, leaving two free ends which constitute terminals 12 and 13 for connection to a suitable source of current. When the cap 8 is placed upon the testing device, the contacts 9 and 10 engage the ends of bars 4 to form a single coil, the free ends 12 and 13 of which are connected to a source of current.

Within the radially placed bars 4, at the lower ends thereof, is secured a base 15 upon which is rotatably mounted a table 16 carrying a block 17 upon which the spring 18 or similar member to be tested may be placed. The table 16 is grooved and carries a belt 19 adapted to be driven from any suitable source of power.

Coil 20 which consists of two coils of fine wire of about 100 turns each, reversely wound, has connected thereto a handle 21. Leads 22, 23 and 24 from said coils are connected, in a suitable manner, to either of two measuring instruments.

Leads 25, connected to terminals 12 and 13 of the magnetizing coil and having a resistor 26 in the circuit, are connected to poles 29 of a double-pole double-throw reversing switch 27, having an opposite set of poles 28. The central poles of said switch are connected to leads 30 connected to a suitable source of direct current. A millivoltmeter 31 is inserted in line 30, a 400 ampere shunt being placed in the circuit. Conductor leads 33 and 34 connected, respectively, to one of the poles 28 and a diagonally opposite pole 29 are connected in circuit with a variable resistor 35. Switch 32, in shunt with leads 33 and 34, serves to short circuit the resistor 35. A millivoltmeter 36 and a 100 ampere shunt 37 are placed in the resistor circuit.

Leads 23 and 24 are connected to the poles 38 and 39, respectively, of a double-throw switch 40, a lead 41 being connected to the central pole thereof and to one of the central poles of a double-pole, double-throw switch 42. Lead 22 is connected to the opposite central pole of switch 42. Poles 43 thereof are connected, by suitable means, to galvanometer 44, and poles 45 are connected, by leads 46 and 47, to a flux meter 48, a variable resistor 49 and a shunt resistance 50 being placed in circuit.

In order to calibrate the flux meter 48, an inductance coil 51 is inserted in the line 47, the mutual inductance of said coil and the opposing coil 52 being known. Coil 52 is connected to double-pole, double-throw reversing switch 53, the central poles of which are connected to a circuit containing a source of current 54 and a variable resistance 55.

The operation of the device for the determination of flaws in a spring is as follows: Switch 27 is made to contact with poles 29; switch 42 with poles 43, and switch 40 with pole 39, the switch 32 being closed. A current of about 300 amperes is passed through leads 30, through switch 27, leads 25 and the magnetizing coils of the testing device. A motor 60, which drives table 16 by means of belt 19, is energized through switch 61 and source of current 62.

Coil 20 is placed over the end of spring 18 and, as said spring rotates, it causes the coil to move downwardly thereover passing through opening 7 in member 6. As the movement takes place, the deflections of galvanometer 44 are noted, the amount of such deflections being a measure of the flaws in that part of the spring over which the coil 20 passes. The movement of the spring is then reversed by reversing the direction of rotation of motor 60.

In order to determine the hysteresis data, switch 32 is closed and exploring coil 20 is moved down to a position approximately at the center of spring 18. Switch 42 is placed in contact with poles 45 and switch 40 with pole 38. Current is passed through the magnetizing coils as before, and the deflections of the flux-meter 48 are read when switch 27 is reversed. In this manner, the maximum induction of the spring being tested is determined.

In order to determine the remanence of the material, switch 27 is opened in order to cut off the source of current, and the corresponding deflection of the flux-meter is noted. This change of induction substracted from the maximum induction gives the remanence.

In order to determine the coercive force, switch 27 is placed in contact with poles 29, switch 32 opened, and then switch 27 is reversed and the flux-meter deflection noted. By proper adjustment of resistance 35, this deflection may be made one-half that obtained for the maximum induction. Under these conditions, the reading of millivoltmeter 36 gives the coercive force.

My apparatus, above described, for testing the quality of hardened material is capable of use for the testing of materials other than springs and of forms different from that shown and described. It will be apparent to those skilled in the art that the apparatus may be modifiied so that forms other than spirals or springs may be tested thereby, and that various modifications in the electrical connections may be made within the scope of my invention.

I claim as my invention:

1. Apparatus for testing helical springs of magnetic materials comprising a cylindrical cage, a rotatable base for mounting a coil spring centrally therein, means for rotating said base, means for passing magnetic flux through said spring, a coil adapted to be engaged with the spring to be tested and means connected to said coil for noting flux densities in said spring.

2. Apparatus for testing helical springs of magnetic materials comprising a cylindrical cage, a rotatable base for mounting a coil spring centrally therein, means for rotating said base, means for passing magnetic flux through said spring, a coil adapted to be engaged with the spring to be tested and means connected to said coil for noting flux densities in said spring, said coil being adapted to traverse the convolutions of said spring during the rotation of the latter.

3. Apparatus for testing magnetic materials comprising a base, U-shaped conducting bars secured therein, a rotatable table for holding a body to be tested and a coil in proximity to said body, said coil being connected to a suitable measuring instrument.

4. Apparatus for testing magnetic materials comprising a base, U-shaped conducting bars forming a closed circuit secured therein, a rotatable table for holding a body to be tested and a coil in proximity to said body, said coil being connected to a suitable measuring instrument.

5. Apparatus for testing magnetic materials comprising a base, U-shaped conducting bars secured therein, a rotatable table for holding a body to be tested between the legs of said U-shaped bars and a coil in proximity to said body, said coil being connected to a suitable measuring instrument.

6. Apparatus for testing magnetic materials comprising a base, radially placed U-shaped conducting bars secured therein, a rotatable table for holding a body to be tested and a coil in proximity to said body, said coil being connected to a suitable measuring instrument.

7. Apparatus for testing magnetic materials comprising a base, U-shaped conducting bars secured therein, a cap having a series of contacts connecting said bars in series, a rotatable table for holding a body to be tested and a coil in proximity to said body, said coil being connected to a suitable measuring instrument.

In testimony whereof, I have hereunto subscribed my name this 11th day of April 1921.

THOMAS SPOONER.